United States Patent
Chang et al.

(10) Patent No.: US 8,310,716 B2
(45) Date of Patent: Nov. 13, 2012

(54) SYSTEMS AND METHODS FOR DESIGNING A SET OF BLACK GENERATION TRANSFER CURVES

(75) Inventors: James Zhixin Chang, Vancouver, WA (US); John Charles Dalrymple, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 153 days.

(21) Appl. No.: 11/951,187

(22) Filed: Dec. 5, 2007

(65) Prior Publication Data

US 2009/0147329 A1 Jun. 11, 2009

(51) Int. Cl.
*G06F 3/12* (2006.01)
*G06F 15/00* (2006.01)

(52) U.S. Cl. .......................... 358/1.9; 358/1.1
(58) Field of Classification Search .......... 358/1.9, 358/1.1
See application file for complete search history.

(56) References Cited

U.S. PATENT DOCUMENTS

| | | | |
|---|---|---|---|
| 5,032,903 A * | 7/1991 | Suzuki et al. | 358/530 |
| 5,416,890 A * | 5/1995 | Beretta | 345/590 |
| 5,596,428 A * | 1/1997 | Tytgat et al. | 358/518 |
| 5,719,689 A | 2/1998 | Terada | |
| 6,039,434 A | 3/2000 | Moroney | |
| 6,215,562 B1 * | 4/2001 | Michel et al. | 358/1.9 |
| 6,466,332 B1 | 10/2002 | Fukasawa | |
| 6,580,822 B1 | 6/2003 | Takei | |
| 6,778,300 B1 | 8/2004 | Kohler | |
| 6,806,979 B2 | 10/2004 | Fukasawa | |
| 6,906,827 B1 | 6/2005 | Katayama | |
| 6,922,197 B2 | 7/2005 | Saito | |
| 7,019,868 B2 * | 3/2006 | Chang et al. | 358/2.1 |
| 7,190,487 B2 * | 3/2007 | Dalrymple et al. | 358/1.9 |
| 7,529,006 B2 * | 5/2009 | Itagaki et al. | 358/519 |
| 2002/0113982 A1 * | 8/2002 | Chang et al. | 358/1.9 |
| 2002/0154325 A1 * | 10/2002 | Holub | 358/1.9 |
| 2003/0020937 A1 | 1/2003 | Fukasawa | |
| 2003/0053086 A1 * | 3/2003 | Chen et al. | 358/1.9 |
| 2003/0133138 A1 | 7/2003 | Namikata | |
| 2004/0109178 A1 | 6/2004 | Couwenhoven et al. | |
| 2004/0183814 A1 | 9/2004 | Saito | |
| 2005/0140997 A1 | 6/2005 | Shirasawa | |
| 2007/0081178 A1 * | 4/2007 | Kim et al. | 358/1.9 |

FOREIGN PATENT DOCUMENTS

| | | |
|---|---|---|
| EP | 1447972 | 8/2004 |
| JP | 2003198863 | 7/2003 |

* cited by examiner

*Primary Examiner* — Benny Q Tieu
*Assistant Examiner* — Eric A Rust
(74) *Attorney, Agent, or Firm* — Austin Rapp & Hardman

(57) ABSTRACT

A method for designing a black generation transfer curve is described. A table is produced to convert a first signal in a first signal space to a second signal in a second signal space. Color measurement data of a device is obtained. The color measurement data relates to a signal-to-color response of the device. A black generation transfer curve is designed constrained by the color measurement data of the device.

17 Claims, 13 Drawing Sheets

SYSTEMS AND METHODS FOR DESIGNING A SET OF BLACK GENERATION TRANSFER CURVES

TECHNICAL FIELD

The present invention relates generally to computers and computer-related digital imaging and printing technology. More specifically, the present invention relates to systems and methods for designing a set of black generation transfer curves used with digital color printing devices.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Imaging devices may be used to convert real images to electronic reproductions of the original images. These electronic reproductions may be manipulated and reproduced. These electronic reproductions may be physically reproduced by a printer. Many different kinds of printers are commercially available. Printers are a type of imaging device.

"Imaging," as the term is used herein, refers to one or more of the processes involved in the capture, processing, display, and/or printing of graphics and/or text. The term "imaging device," as used herein, refers to any electronic device that provides functionality related to imaging. Some examples of imaging devices include printers, multi-functional peripherals, copiers, scanners, facsimile devices, document servers, image servers, electronic whiteboards, digital cameras, digital projection systems, medical imaging devices, and so forth.

Colors output by an imaging device may be derived from an image whose colors are originally specified in a color space different from the imaging device's native color space. That is, an imaging device that receives an image in a first color space may convert the image to a second color space. The algorithms used for such a conversion may affect the visual quality of the colors of the output image produced by the imaging device. Thus, benefits may be realized by providing systems and methods for designing black generation transfer curves to improve the conversion from a first color space to a second color space.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
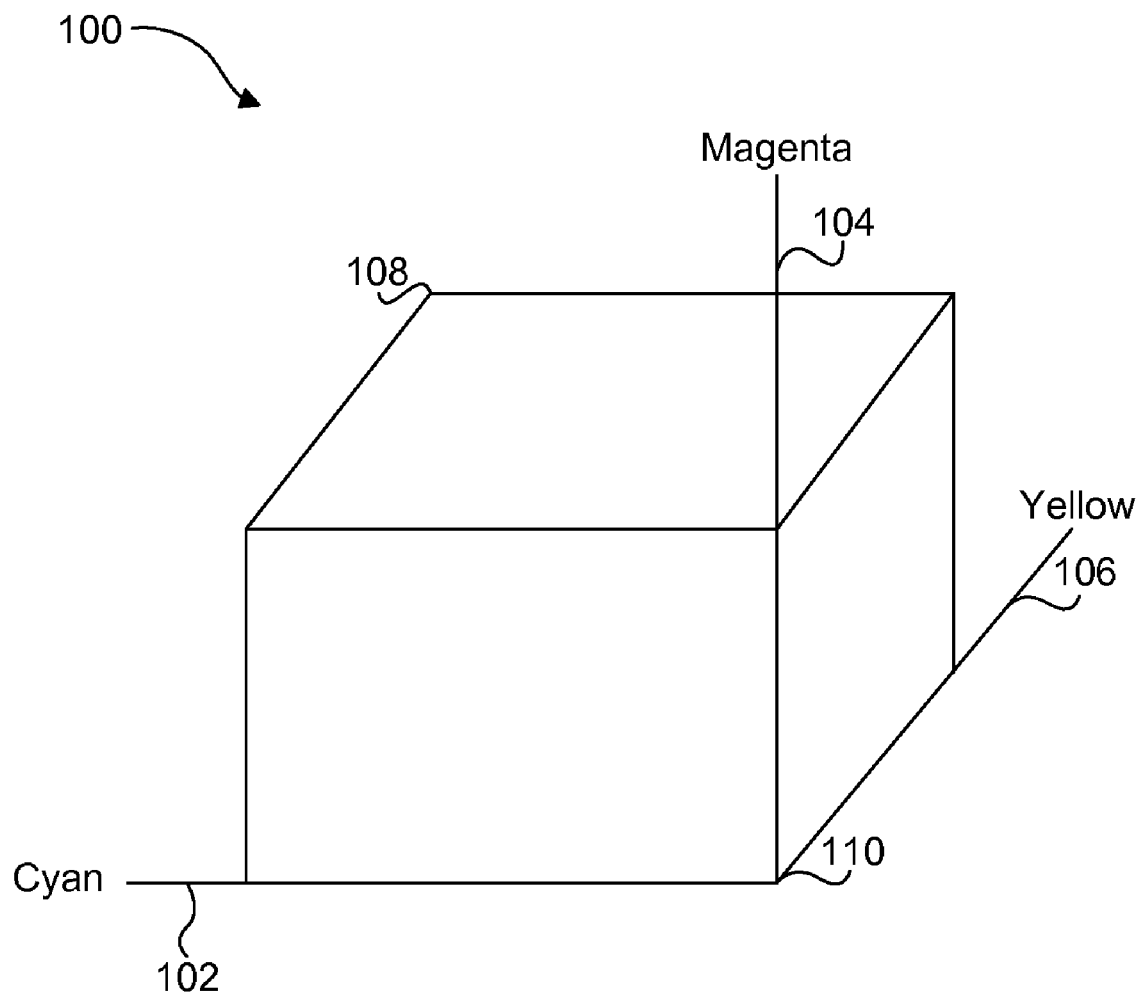
FIG. 1 illustrates one embodiment of a CMY color space.

A method for designing a black generation transfer curve is described. A table is produced to convert a first signal in a first signal space to a second signal in a second signal space. Color measurement data of a device is obtained. The color measurement data relates to a signal-to-color response of the device. A black generation transfer curve is designed constrained by the color measurement data of the device.

In one example, the first signal is a generic red, green and blue (RGB) signal. The first signal may also be a cyan, magenta and yellow (CMY) signal. In one example, the second signal is a cyan, magenta, yellow and black (CMYK) signal. The color measurement data may be used to obtain a perceptual constraint between the first signal and the second signal.

The perceptual constraint may be a linearity constraint. The linearity constraint may be based on linearizing a relative lightness with respect to a dark point and a chromatic primary or secondary color point. The linearity constraint may also be based on linearizing a relative chroma with respect to a dark point and a chromatic primary or secondary color point. The linearity constraint may further be based on linearizing a relative metric distance with respect to a dark point and a chromatic primary or secondary color point. In addition, the linearity constraint may be based on linearizing a fractional arclength along a device gamut boundary with respect to a dark point and a chromatic primary or secondary color point.

In one example, a feasible region in relation to the linearity constraint may be provided. The feasible region may depend on the measurement data. The feasible region may be defined by a plurality of bounding curves. The black generation transfer curve may be related to a "K" component of a CMYK signal. A black generation transfer curve related to a single chromatic primary component of a CMYK signal may be adjustable, and a black generation transfer curve related to the remaining two chromatic primary components of the CMYK signal may be fixed.

A black generation transfer curve related to two chromatic primary components of a CMYK signal may be adjustable, and a black generation transfer curve related to the remaining chromatic primary component of the CMYK signal may be fixed. The device may include an imaging device. In one example, either the black generation transfer curve related to a "K" component or the black generation transfer curve related to a chromatic component of a CMYK signal may be adjusted. A black generation transfer curve that is not adjusted may be automatically updated in relation to the adjustment.

A system that is configured to design a black generation transfer curve is also described. T system includes a processor and memory in electronic communication with the processor. Instructions are stored in the memory. Color measurement data of an imaging device is obtained. The color measurement data relates to a signal-to-color response of the imaging device. A black generation transfer curve constrained by the color measurement data of the imaging device is designed. A table to convert a first signal in a first signal space to a second signal in a second signal space is produced.

A computer-readable medium including executable instructions for designing a black generation transfer curve is also described. A table to convert a first signal in a first signal space to a second signal in a second signal space is produced. Color measurement data of an imaging device is obtained. The color measurement data relates to a signal-to-color response of the imaging device. A black generation transfer curve constrained by the color measurement data of the imaging device is designed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The present systems and methods are employed by a color-reproduction specialist in the course of designing curves for curve-based black generation techniques. Prior-art techniques enable unconstrained design of these curves without direct feedback based on the actual printer measurement data. An example of actual printer measurement data may include a signal-to-color response. In one embodiment, signal refers to digital code values that are sent to a digital image output device (e.g. monitor, printer, etc.) or received from a digital image input device (e.g. camera, scanner, etc.) Color may refer to psychophysically-based colorimetry as defined by the Commission Internationale de L'Eclairage (CIE) standards, which quantify visual color matching for a color-normal human observer under photopic viewing conditions. The present systems and methods use the measurement data of a device, such as a printer, to constrain the curve design process and show the effects of the designed curves based on the device's measurement data.

Most color printers use cyan, magenta, yellow and key (black) (CMYK) as printing colorants. The black colorant, K, is used to enhance the shadow detail in printed images, and/or to reduce excess colorant buildup in dark areas of printed images. With CMYK colorants, it is usually possible to satisfactorily reproduce an input color, specified in a psychophysically-based color space such as a Lab color space where L represents a lightness response and a and b represent the red-vs.-green and yellow-vs.-blue color-opponent responses, respectively, within the human visual system. CMYK colorants may also be used to reproduce an input color specified in a monitor based color space such as a Red, Green, Blue (RGB) color model. For many input colors, there exist multiple different combinations of the CMYK colorants that can correctly reproduce these input colors.

In a printing system, color conversion tables may be implemented to indicate the different amounts of CMYK that should be deposited on the print substrate to produce a rendition of the input color. In table generation software tools, which color reproduction engineers employ for developing color conversion tables, a process known as black generation may be used to specify which specific CMYK combination will be used for each input color to be reproduced. Specifying black generation may include designing transfer curves. The shapes of these transfer curves can greatly affect the quality of a conversion from one color space to another. If the transfer curves are poorly designed, the resulting printer color gamut may be limited and the characteristics of the color space may be highly non-linear. In other words, the visually perceived difference in printed color, for a fixed amount of change in the CMY components, may be noticeably larger in some regions of CMY space and noticeably smaller in other regions.

FIG. 1 illustrates one embodiment of a CMY color space 100. The CMY color space may be referred to as the CMY color space cube. As previously mentioned, the CMY color space 100 and the CMYK color space may be used in color printing. The CMY color space 100 uses cyan 102, magenta 104 and yellow 106 as the primary colors. Red, green and blue may be produced by pairwise combinations of these primary colors, and hence are referred to as secondary colors in the CMY color space 100.

In one embodiment, the CMY color space 100 is subtractive. For example, white 110 may be located at the point (C,M,Y)=(0, 0, 0) and black 108 may be located at the point (C,M,Y)=(1, 1, 1). Equivalently, percentages of maximum available colorant amounts may be alternatively used to specify points in a CMY (or CMYK) space. For example, black 108 may be represented as 100% each of C, M and Y in CMY color space 100. In other words, if the color white 110 is the starting color and no colors are subtracted, the color white 110 will remain the color. Ideally, if white 110 is the starting color and equal amounts of the C, M and Y primary colors are subtracted at the maximum available level of colorant deposition, the color black 108 will be produced. That is, nominally, by subtracting C, M and Y from white, the color black 108 will be the resultant color.

The CMYK color space is a variation on the CMY color space 100. The CMYK color space adds black. In one embodiment, equal components of cyan 102, magenta 104 and yellow 106 inks form a dark brown, not black, color. As such, adding black ink to the mix of cyan 102, magenta 104 and yellow 106 may produce a black color. In addition, the CMY amounts may also be rebalanced to produce a black color. For example, the amount of cyan 102 may be larger than the amounts of magenta 104 and yellow 106 in order to achieve a visually neutral mix of CMY. Black generation may be used in color table generation tools to embed a 3D subspace within the 4D CMYK space. This subspace may be labeled (or indexed) as RGB or CMY. The RGB or CMY labeling or indexing coordinates define points that are located in what may be referred to as a virtual device space or a generic space. In one embodiment, the CMY color space 100 and the CMYK color space may be in reference to a specific device.

Figure 2:
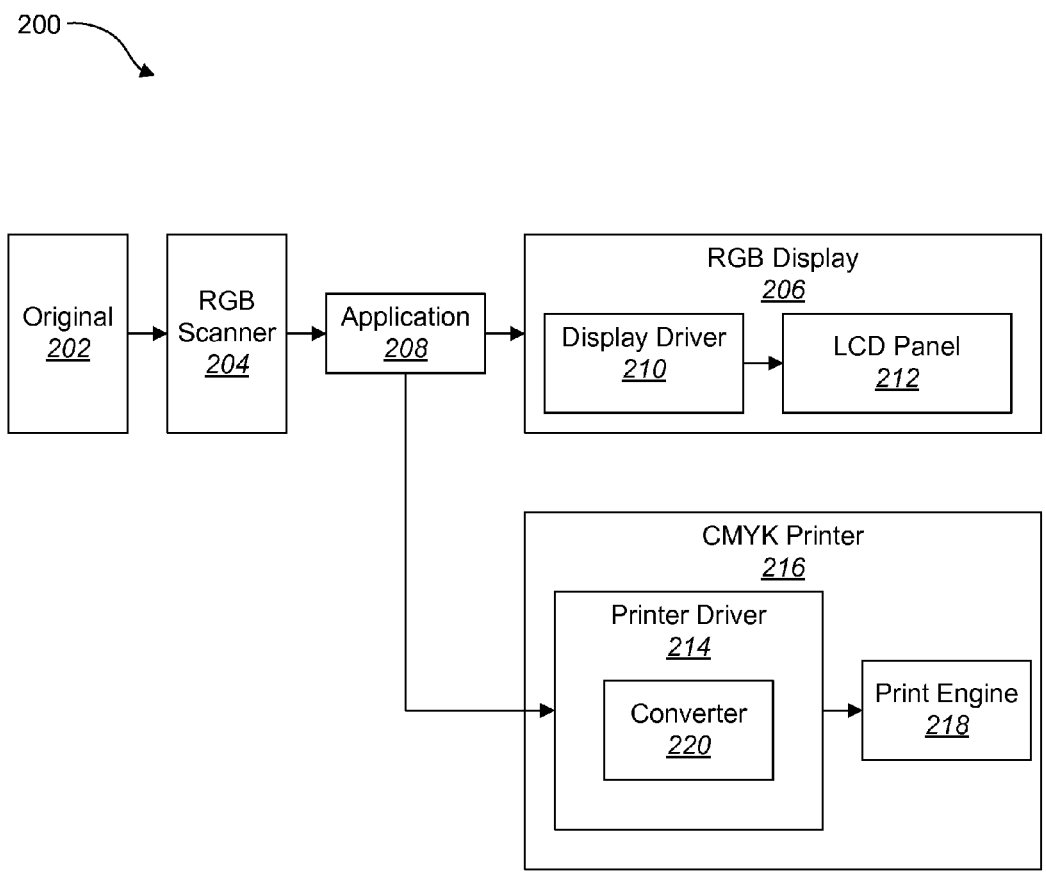
FIG. 2 is a block diagram illustrating one embodiment of an imaging system.

FIG. 2 is a block diagram illustrating one embodiment of an imaging system 200. In one embodiment, an original color input 202 is scanned by a scanner 204. The scanner 204 may be an RGB scanner that converts the original color input 202 to a first color space, such as the RGB color space. An application 208 may act as a central controller for various imaging devices, such as an RGB display 206 and a CMYK printer 216. The RGB display 206 may include a display driver 210 that receives and processes the color input from the application 208. A driver 210 may control the display 206 and cause the color input to be displayed on a LCD panel 212.

The application 208 may also be the central controller for the CMYK printer 216. The printer 216 may include a printer driver 214 that receives and processes the color input from the application 208. The printer driver 214 may include a converter 220 that converts the input colors to the printer CMYK colors for printing. The converted input colors may be sent to a print engine 218 for printing.

Figure 3:
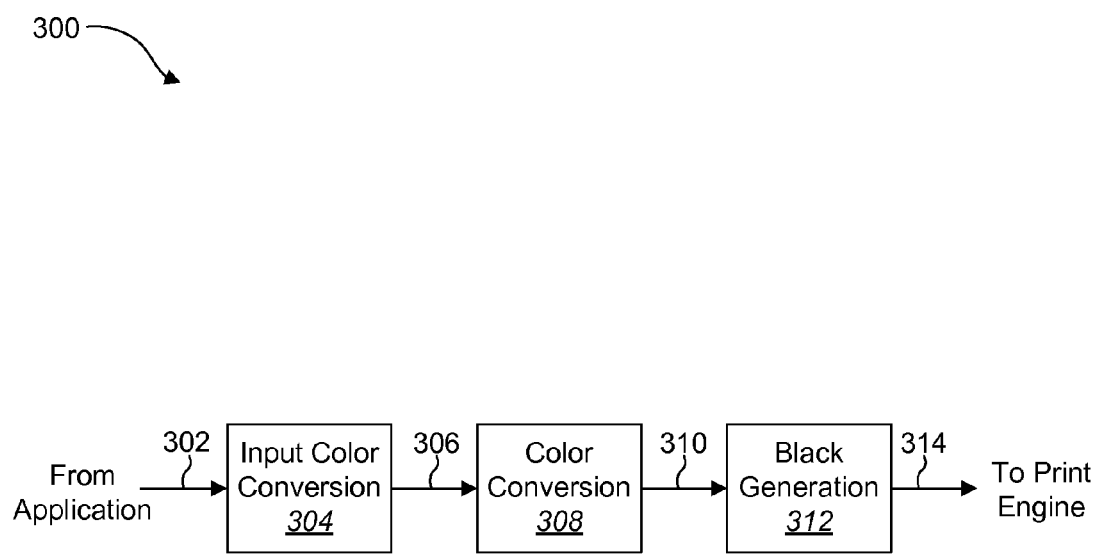
FIG. 3 is a flow diagram illustrating one embodiment of a process for converting colors inside the printer driver.

FIG. 3 is a flow diagram illustrating one embodiment of a process 300 for converting colors inside the printer driver 214. Input color 302 from an application is converted 304. In one embodiment, the input color 302 is scanner RGB. The input color conversion 304 produces Lab or XYZ output color 306. The Lab or XYZ output color is converted 308 to printer RGB 310, which may be referred to as virtual device RGB or generic RGB. The printer RGB 310 is provided to a black generation process 312 which produces printer CMYK 314. The printer CMYK 314 comprises actual device data which is sent to the print engine 218 for printing. The present systems and methods implement black generation using multiple sets of 1-D transfer curves such as the 1-D, 2-D and 3-D black generation. The details of the 3-D black generation architecture are discussed in U.S. Pat. No. 7,190,487 which is herein incorporated by reference.

Figure 4:
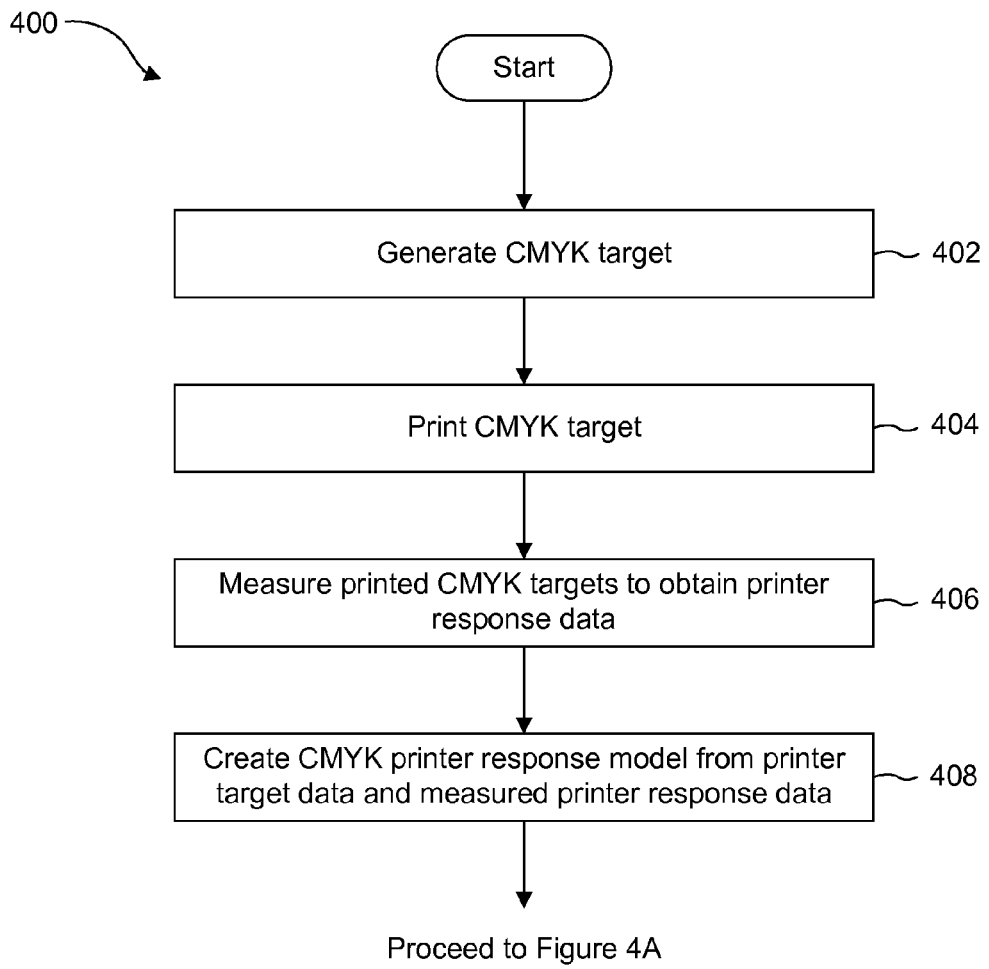
FIG. 4 is a flow diagram illustrating a preliminary method for creating a printer response model using printer measurement data.

FIG. 4 is a flow diagram illustrating a preliminary method 400 for creating a printer response model using printer measurement data. In one embodiment, the model may calculate output color in Lab for any input CMYK.

In one embodiment, a CMYK target is generated 402 and printed 404. The printed CMYK targets are measured 406 to obtain printer response data. A CMYK printer response model is created 408 from the printer target data and the measured printer response data. The created model may be used in the method for designing the CMYK curves for black generation.

Figure 4A:
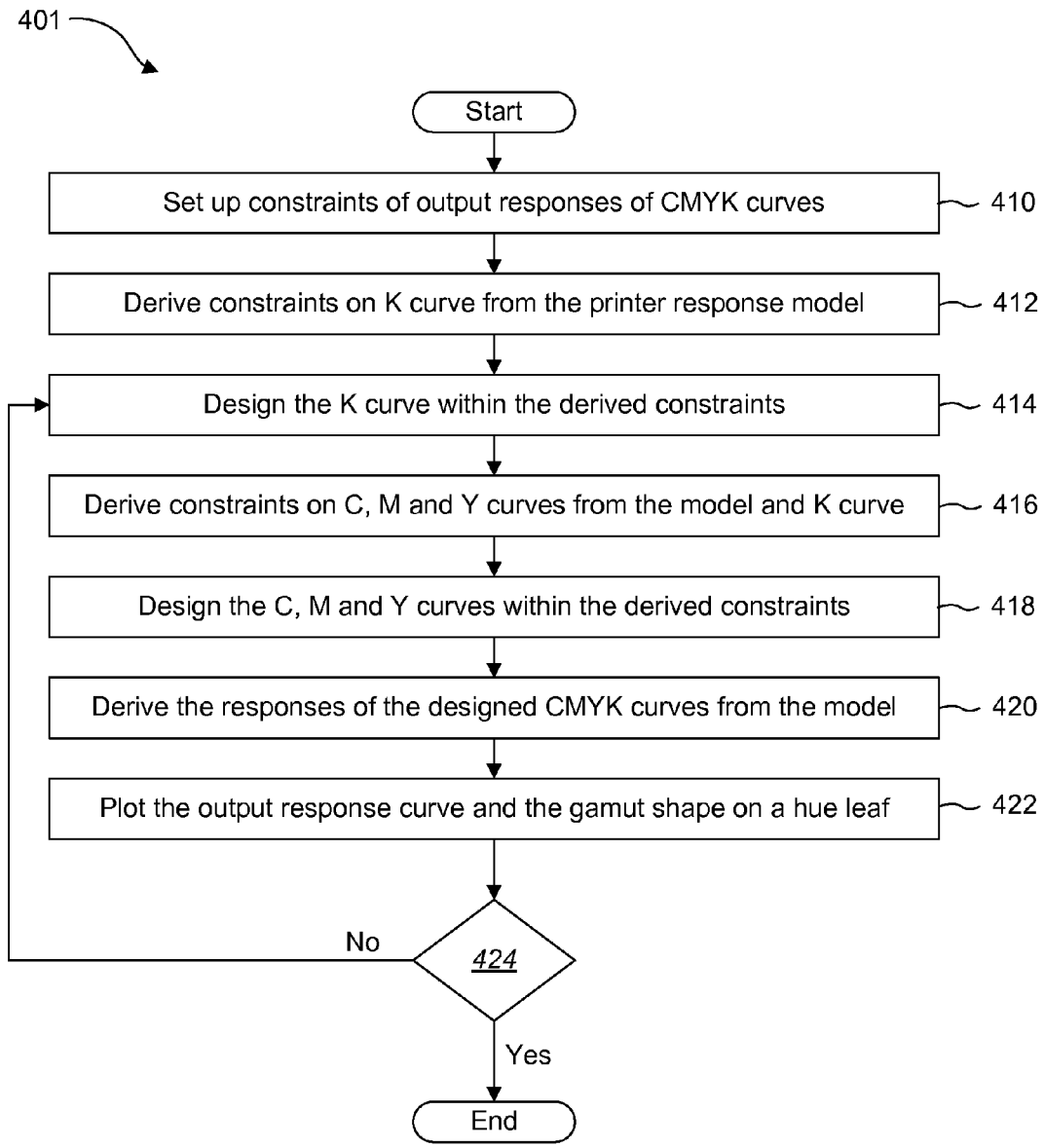
FIG. 4A is a flow diagram illustrating one embodiment of a method for designing CMYK black generation curves

FIG. 4A is a flow diagram illustrating one embodiment of a method 401 for designing CMYK black generation curves. Constraints of output responses of CMYK curves may be set up 410. Constraints on a K curve may be derived 412 from the printer response model discussed in FIG. 4. In another embodiment, color measurement data may be used to obtain a perceptual constraint. The perceptual constraint may be a linearity constraint that is based on linearizing a relative lightness with respect to a dark point and a chromatic primary or secondary color point. A dark point is to be understood as comprising the color produced by the CMYK device values resulting from the black generation process when all the generic or virtual device RGB values are equal to zero, or equivalently, when all the generic or virtual device CMY values are equal to one (100%). In another embodiment, the linearity constraint is based on linearizing a relative chroma with respect to a dark point and a chromatic primary or secondary color point. In a further embodiment, the linearity constraint is based on linearizing a relative metric distance with respect to a dark point and a chromatic primary or secondary color point. In addition, the linearity constraint may be based on linearizing a fractional arclength along a device gamut boundary with respect to a dark point and a chromatic primary or secondary color point.

The K curve may be designed 414 within the derived constraints. In one embodiment, constraints on the C, M and Y curves are derived 416 from the printer response model and the K curve. The C, M and Y curves may be designed 418 within the derived constraints. Alternatively, at least one of the C, M and Y curves may be automatically derived based on the derived constraints. The responses of the designed CMYK curves may be derived 420 from the printer response model. In addition, the responses of the derived CMYK curves may be derived 420 from the printer response model. The output response curve and the gamut shape may be plotted 422 on a hue leaf from the responses of the CMYK curves. The design process is iterative. The user may examine the output response curve and gamut shape that has been plotted 422. A determination 424 is made as to whether the plotted 422 curves are satisfactory. If the plotted 422 curves are satisfactory, a switching module will complete the design process. Otherwise, a re-iteration of the design 414, 416 of the K, C, M and Y curves is executed. In other words, the K and C, M and Y curves are redesigned.

Depending on how many sets of black generation curves are designed and used, the method 401 may be characterized as 1-D, two dimensional (2-D) and 3-D curve-based black generation. For 1-D curve-based black generation, one set of four black generation curves may be designed 401 and used. In one embodiment, one curve is used to generate and obtain the "K" signal and the remaining three transfer curves are used for obtaining the final CMY signals. For 2-D curve-based black generation, two sets of four black generation curves may be used. In one embodiment, one set is used for colors near the center diagonal of the CMY color space cube 100 and the other set of transfer curves may be used for the colors on the surface of the CMY color space cube 100. For 3-D curve-based black generation, additional sets of curves may be used. In one embodiment, the method 401 uses seven sets of four curves, where one set of curves may be used for the center diagonal of the CMY color space cube 100 and the other six sets may be used for the surface of the cube 100.

As previously stated, the transfer curve design method 401 may include the design of a set of four transfer curves on various line segments within the CMY color space cube 100. One curve may be used to generate the "K" signal, and the other three transfer curves may be used to generate the final CMY signals. The number of sets that are designed may depend on the type of the curve-based black generation. For 1-D curve-based black generation, one set of transfer curves may be designed. For 2-D curve-based black generation, two sets of transfer curves may be designed and used. For 3-D curve-based black generation, seven sets may be designed. A black generation curve related to a single chromatic primary component of a CMYK signal may be adjustable and a black generation transfer curve related to the remaining two chromatic primary components of the CMYK signal may be fixed. In another embodiment, the black generation transfer curve related to two chromatic primary components of a CMYK signal is adjustable, and a black generation transfer curve related to the remaining chromatic primary component of the CMYK signal is fixed.

Figure 5:
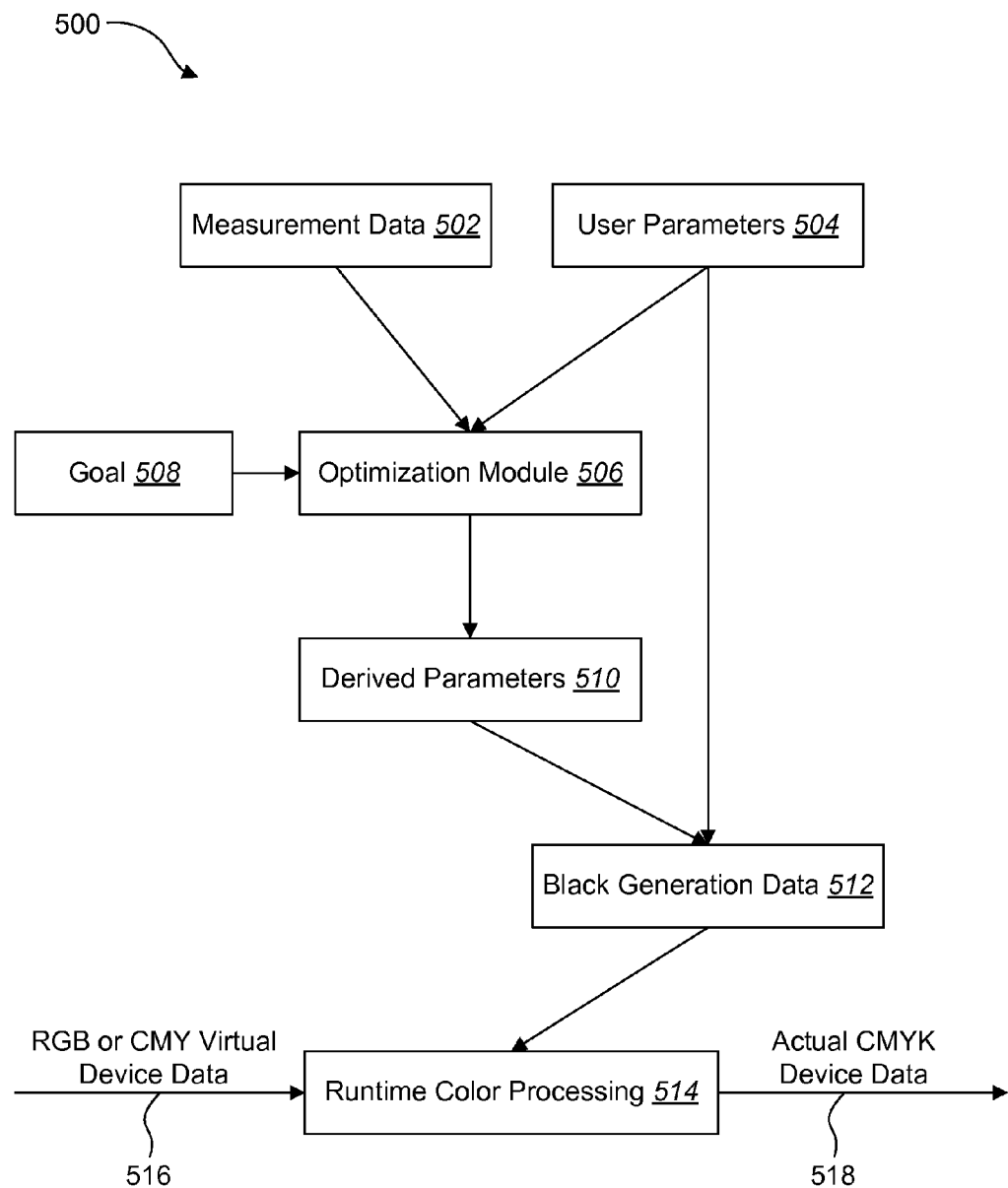
FIG. 5 is a flow diagram illustrating a further embodiment of a transfer curve design method.

FIG. 5 is a further embodiment of a transfer curve design method 500. In one embodiment, measurement data 502 and user parameters 504 may be provided to an optimization module 506. Black generation data 512 comprises unconstrained data directly specified as user parameters 504, together with constrained data, referred to as derived parameters 510, which are produced by optimization module 506, based on measurement data 502 and user parameters 504 and a goal (or constraint) 508. The black generation data 512 may be provided to a runtime color processing module 514. The runtime color processing module 514 may receive the black generation data 512 and RGB or CMY virtual device data 516 as inputs. The runtime color processing module 514 may process these inputs and output actual CMYK device data 518.

Figure 6:
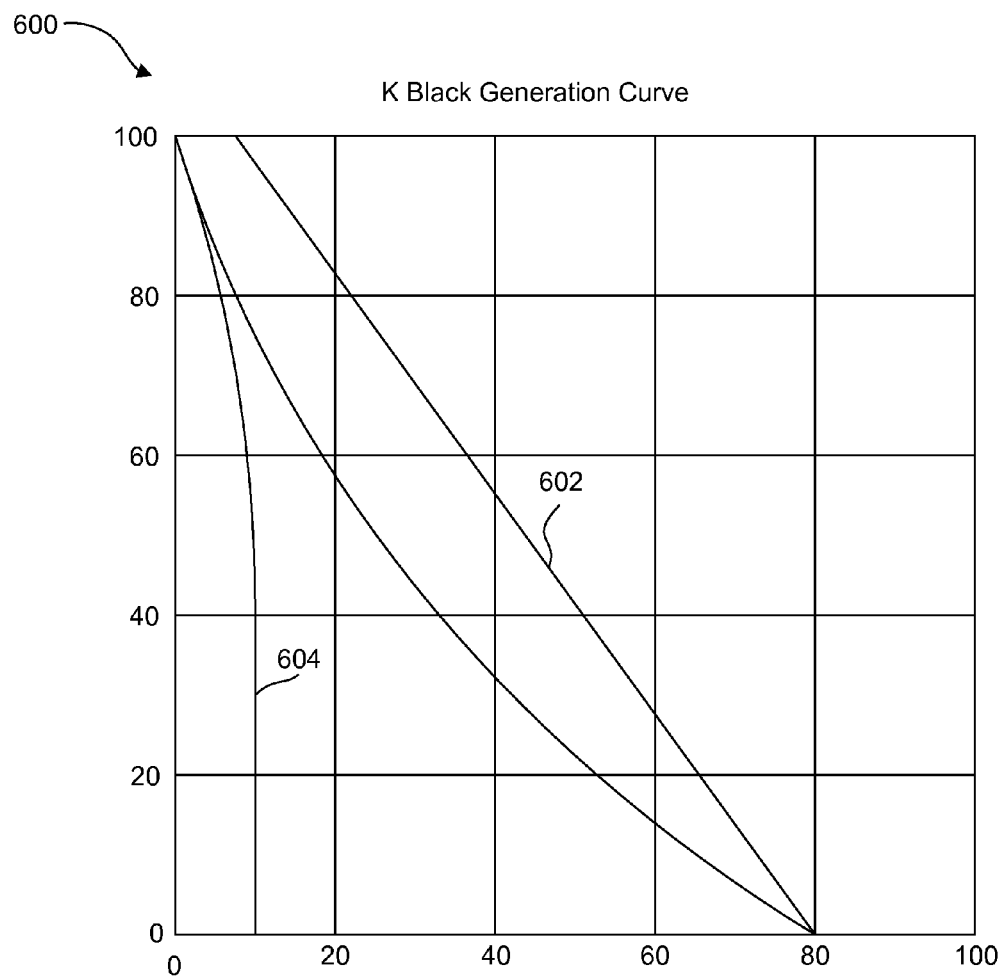
FIG. 6 is a graph that illustrates one embodiment of a design process for a "K" curve.
Figure 7:
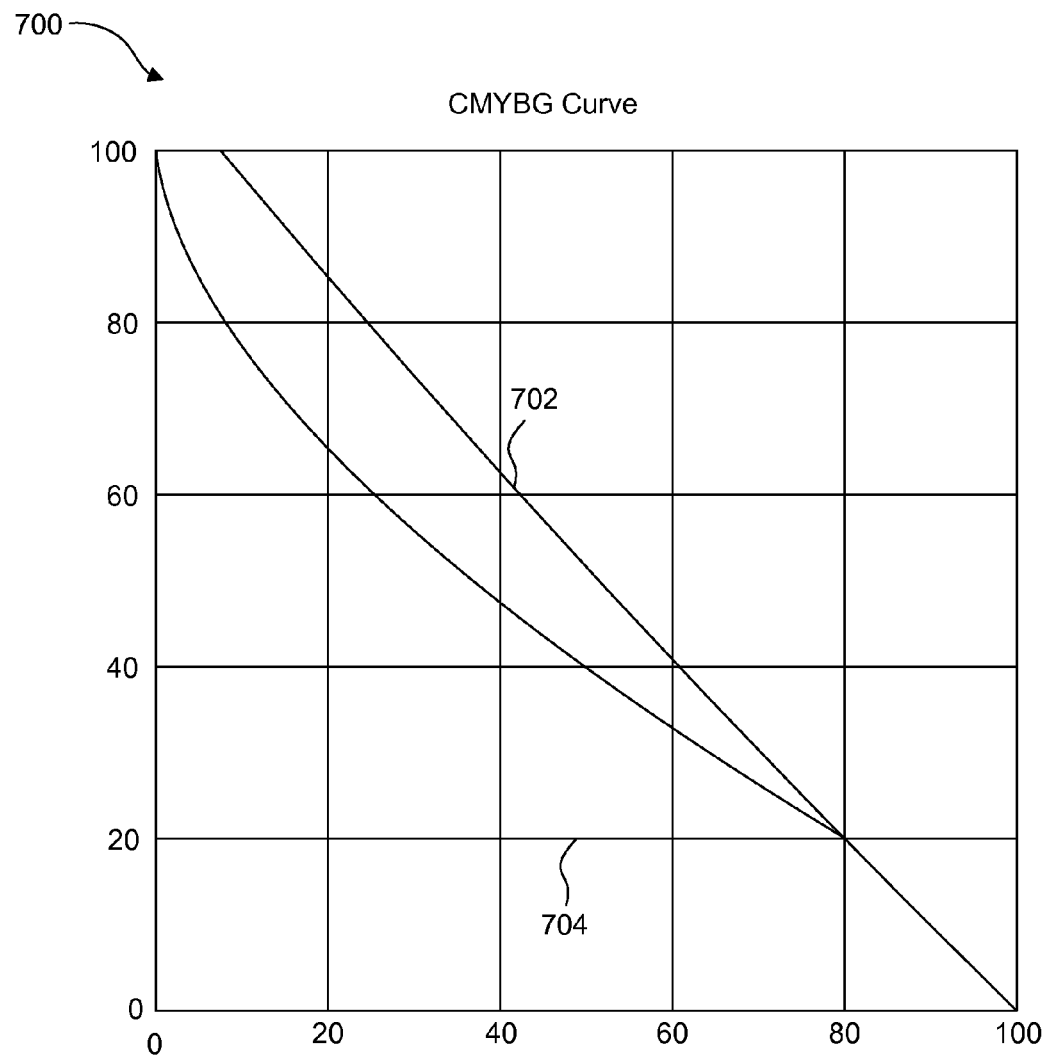
FIG. 7 is a graph that illustrates one embodiment of a design process for a "C" curve.
Figure 8:
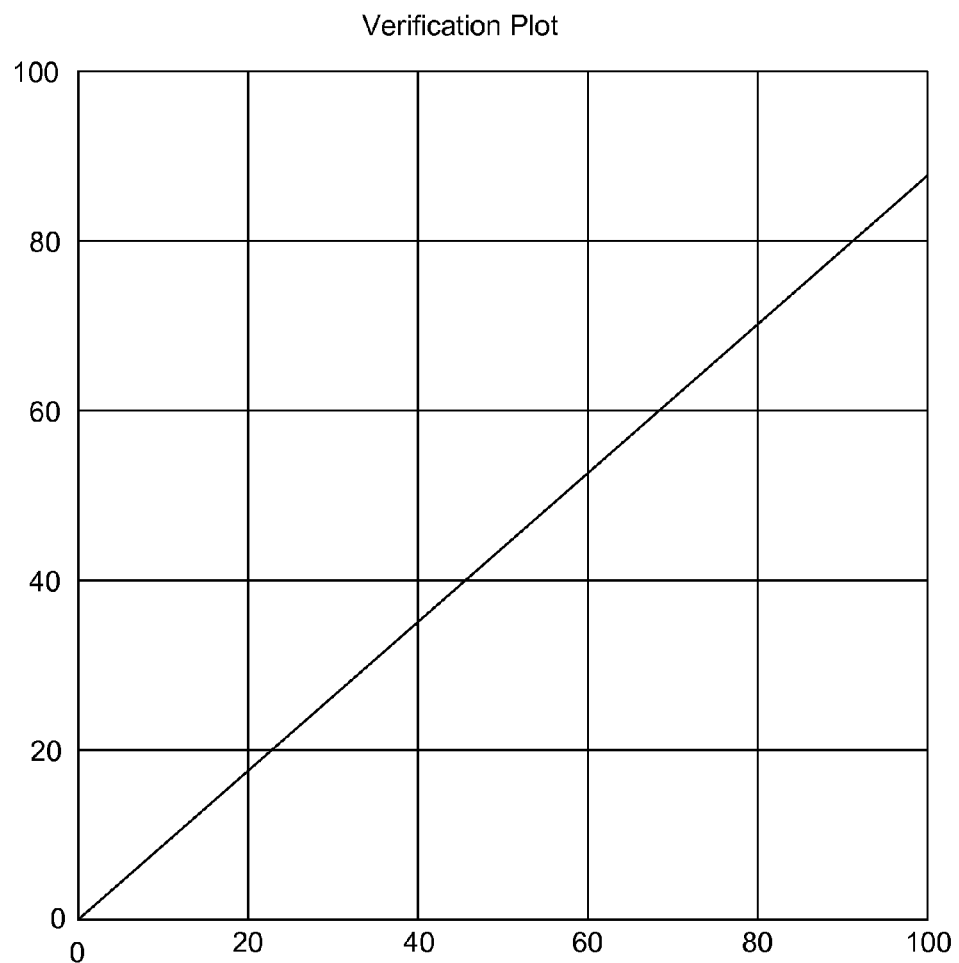
FIG. 8 is a graph that illustrates one embodiment of a verification plot for the design process.
Figure 9:
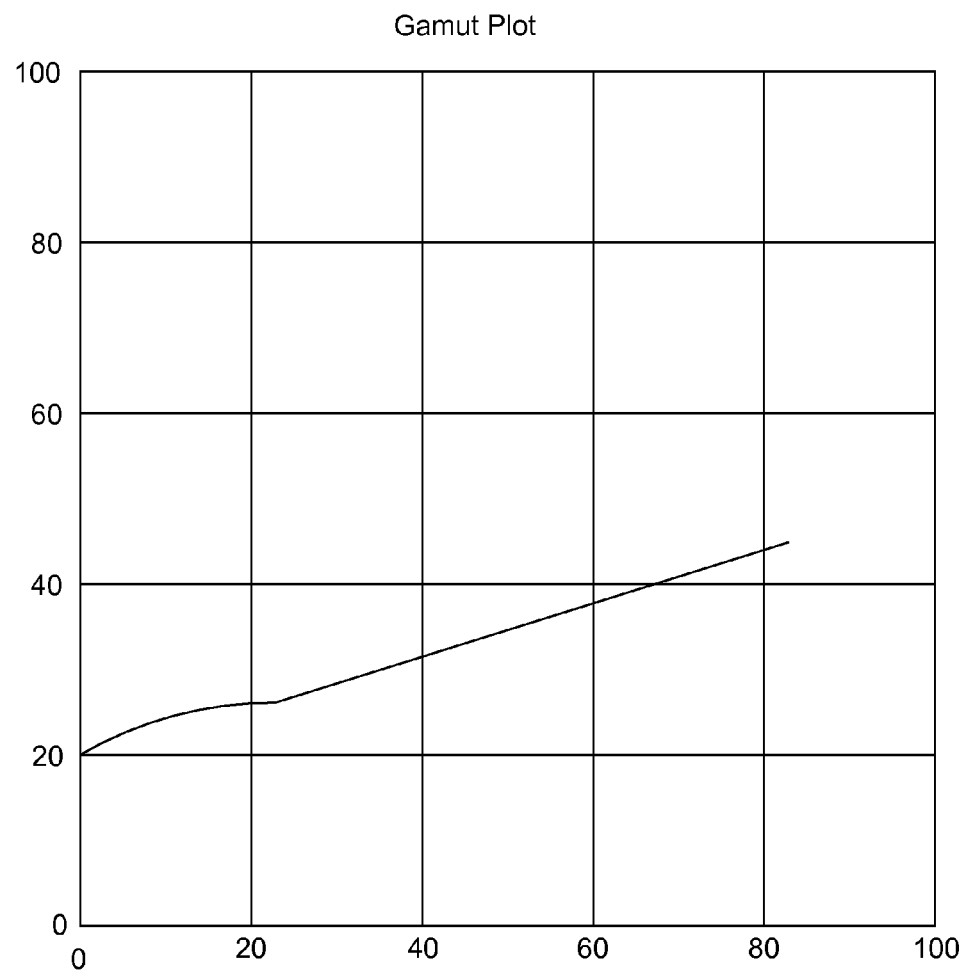
FIG. 9 is a graph that illustrates one embodiment of a gamut boundary.

FIGS. 6-9 are graphs that illustrate one embodiment of a design process for a set of transfer curves on a black-to-red boundary of the CMY cube 100 in accordance with the methods described in U.S. Pat. No. 7,190,487. The horizontal axis of FIGS. 6, 7, and 8 represents the fractional distance in CMY virtual-device signal space (expressed as a percentage) along the line segment from black (equal and maximal concentrations of CMY color components) to red (equal and maximal concentrations of M and Y color components and no C color component). The line segment from black to red may be referred to as a black-to-red ramp. FIG. 9 represents the resulting gamut boundary shape along the black-to-red boundary, where the horizontal axis represents the chroma and the vertical axis represents the lightness. The gamut curve plots the resulting chroma and lightness pairs as the virtual device CMY signal moves from black to red on the black-to-red boundary. For example, black may be represented as a virtual device signal of C=M=Y=100%, red may be represented as a virtual device signal of C=0 and M=Y 100%, and the C signal varies from 100% to 0% along the black-to-red ramp.

In one embodiment, for the black-to-red ramp, the M and Y colorants are kept at the maximum concentrations allowed. In the examples shown, the maximum allowed ink coverage of a single ink is 100%, and the maximum allowed coverage at the dark point is 400%. In other words, the M and Y colorants are kept at 100% all along the black-to-red ramp, which implies that the transfer curves for M and Y (not plotted) are horizontal lines at 100%. If the maximum ink coverage needs to be limited to less than 400%, a bijective transformation may be used to map the actual CMYK space into a normalized CMYK space, where the maximum allowed coverage for the actual CMYK space may be represented as 400% coverage in the normalized CMYK space. In one embodiment, the design of the transfer curves may be performed in the normalized CMYK space. With the M and Y curves thus fixed, only a K transfer curve 600 and a C transfer curve 700 need be designed.

If both the K and C transfer curves 600, 700 are arbitrarily specified, the visual appearance of the black-to-red ramp may not be satisfactory. In one embodiment, a desirable property of this color ramp is evenness as the ramp moves from the dark point (black) to pure red. In order to achieve this property, a perceptually linear relationship between the color specification of the ramp as virtual-device signal values and the resulting visual properties such as lightness or chroma, or a combination of these, is desired.

Continuing with the illustrative example of the black-to-red ramp, when a perceptual linearity constraint is imposed, the K and C transfer curves 600, 700 may not be designed independently of each other. For example, once one of the transfer curves is designed, the other may be derived using the imposed linearity constraint. Enforcing a linearity constraint may simplify the transfer curve design process. FIG. 6 illustrates a K curve 600 and FIG. 7 illustrates a C curve 700. Further, with a linearity constraint, the design of the transfer curves may be limited by bounding curves 602, 604 that depend on a device's color response (as shown by the measurement data). In other words, it may only be possible to meet the linearity constraint in a region, which may be referred to as a feasible region, between the bounding curves 602, 604. For the K curve in FIG. 6, the lower bound 604 may be obtained from the K response data with C=100% and the upper bound curve 602 may be derived from the K response data with C=0%.

For the C curve in FIG. 7, the lower bound curve 704 is a horizontal line dependent on a K threshold value. In one embodiment, on the black-to-red ramp, only CMY colorants are used beyond the K threshold. The upper bound curve 702 for the C curve design may be derived from the C response data with K=0%. If the K or C curve goes beyond its respective bounds, it may not be possible to maintain the linearity relationship.

The above discussion for the black-to-red ramp is illustrative. For a typical case of 3D black generation, K curve designs are performed for seven different ramps in all: black-to-red, black-to-yellow, black-to-green, black-to-cyan, black-to-blue, black-to-magenta and black-to-white.

FIG. 8 illustrates a verification plot 800 which indicates how well the applied perceptual constraint is satisfied. The vertical axis of the verification plot is a perceptual metric being linearized, in this case, lightness. The measurement data 218 of a device may also define the gamut boundary 900 illustrated in FIG. 9. The horizontal axis of the gamut plot is chroma, and the vertical axis is lightness. If the achieved gamut boundary shape is not satisfactory, a user may adjust the K curve 600 and/or the C curve 700, and the gamut plot 900 (along with others) is automatically updated to show the effect of the adjustment.

Figure 9A:
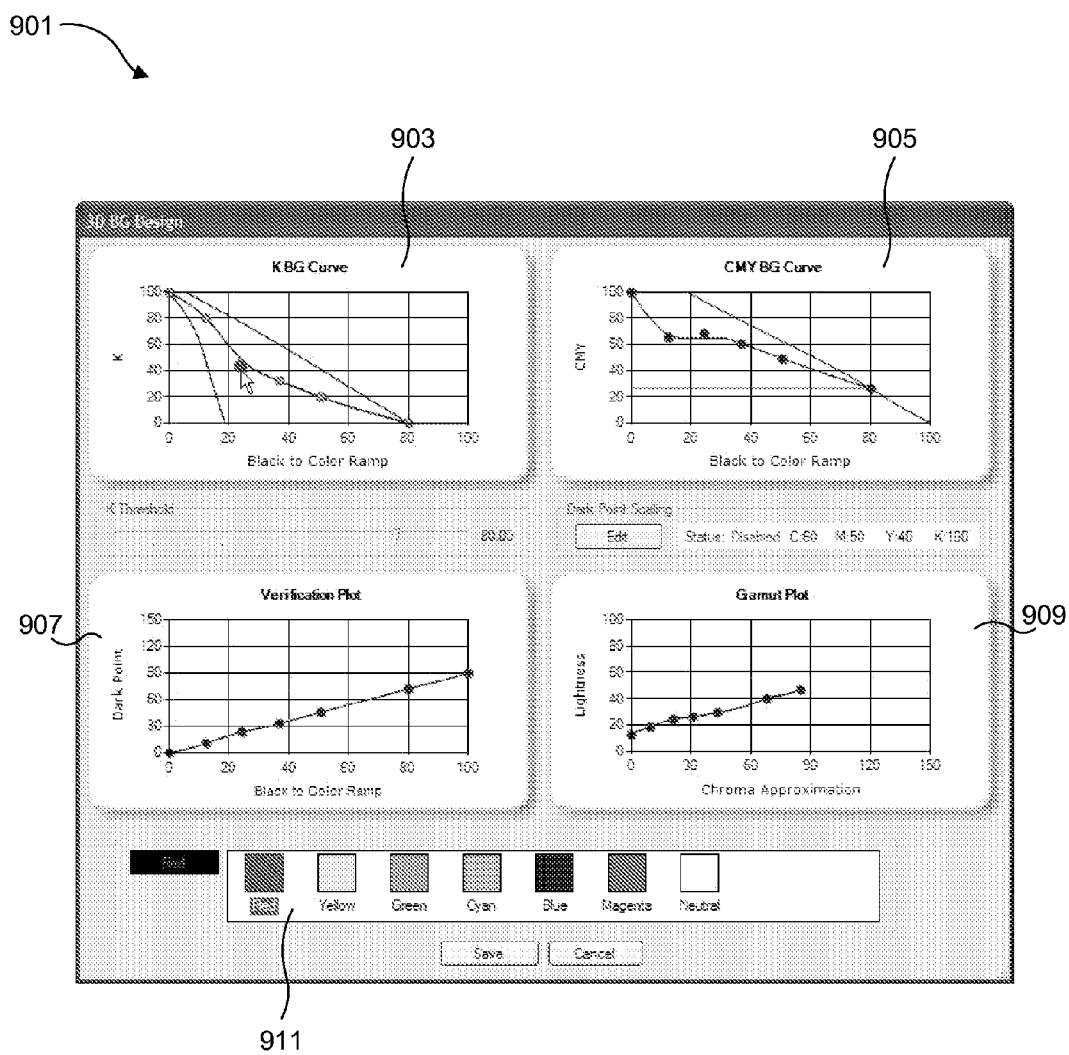
FIG. 9A is an embodiment of a user interface to design a transfer curve.

FIG. 9A is one embodiment of a user interface 901 that a user may use to design a set of black generation transfer curves for the 3D black generation method of U.S. Pat. No. 7,190,487. The user may manipulate the "K" curve 903 between the upper and lower bounds as previously explained with reference to FIG. 6. When the "K" curve 903 is manipulated, the CMY Curve 905, verification plot 907 and gamut plot 909 are also altered. As such, the user may manipulate the "K" curve 903 until a desired set of black generation transfer curves are obtained by evaluating the changes to the CMY curve 905, the verification plot 907 and the gamut plot 909. The user interface 903 also includes a color list 911. The user may select a color from the list 911 and may generate a set of black generation transfer curves for each color on the list 911. In the depicted embodiment, the user is designing the black generation for red (i.e., the black-to-red ramp), and CMY curve 905 represents the cyan transfer curve.

Figure 9B:
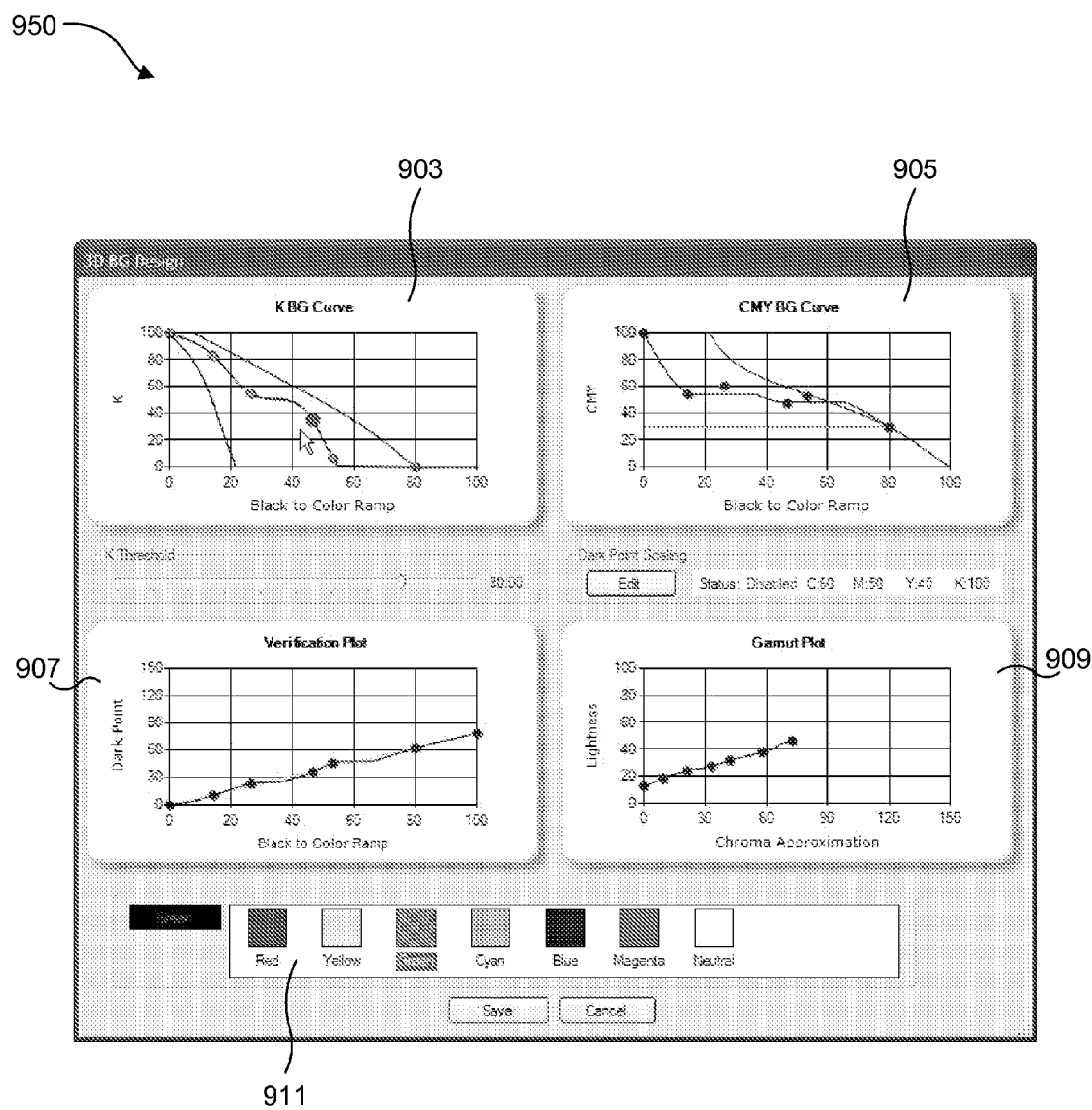
FIG. 9B is another embodiment of the user interface to design a transfer curve.

FIG. 9B illustrates another embodiment of the user interface 950 that a user may use to design a set of black generation curves. As shown, the user may further manipulate the "K" curve 903 which causes subsequent alterations in the CMY curve 905, the verification plot 907 and the gamut plot 909. The user may carry out this process for each color listed within the color list 911. FIG. 9B differs from FIG. 9A in that the user has manipulated the "K" curve 903 in a different manner which subsequently alters the other graphs 905, 907, 909. In the depicted embodiment, black generation is being designed for the color green (i.e., the black-to-green ramp), and CMY curve 905 represents the magenta transfer curve.

Figure 10:
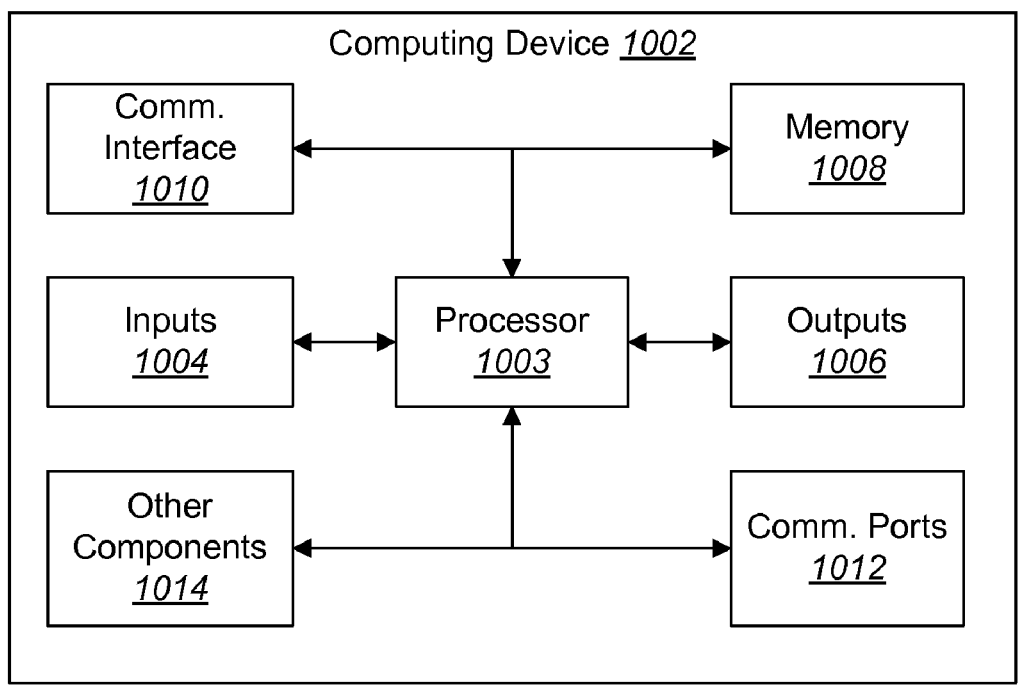
FIG. 10 is a block diagram illustrating the major hardware components typically utilized with embodiments herein.

FIG. 10 is a block diagram illustrating the major hardware components typically utilized with embodiments herein. The systems and methods disclosed may be used with a computing device 1002. The major hardware components typically utilized in a computing device 1002 are illustrated in FIG. 10. A computing device 1002 typically includes a processor 1003 in electronic communication with input components or devices 1004 and/or output components or devices 1006. The processor 1003 may be operably connected to input 1004 and/or output devices 1006 capable of electronic communication with the processor 1003, or, in other words, to devices capable of input and/or output in the form of an electrical signal. Embodiments of devices 1002 may include the inputs 1004, outputs 1006 and the processor 1003 within the same physical structure or in separate housings or structures.

The computing device 1002 may also include memory 1008. The memory 1008 may be a separate component from the processor 1003, or it may be on-board memory 1008 included in the same part as the processor 1003. For example, microcontrollers often include a certain amount of on-board memory. The memory 1008 may store information such as lookup tables, equations, and/or other information that may be used with the present systems and methods.

The processor 1003 may also be in electronic communication with a communication interface 1010. The communication interface 1010 may be used for communications with other devices 1002. Thus, the communication interfaces 1010 of the various devices 1002 may be designed to communicate with each other to send signals or messages between the computing devices 1002.

The computing device 1002 may also include other communication ports 1012. In addition, other components 1014 may also be included in the computing device 1002.

Many kinds of different devices may be used with embodiments herein. The computing device 1002 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 10 is only meant to illustrate typical components of a computing device 1002 and is not meant to limit the scope of embodiments disclosed herein. Thus, the term computing device is used to mean one or more broadly defined computing devices unless it is expressly stated otherwise. Computing devices include the broad range of digital computers including microcontrollers, hand-held computers, personal computers, servers, mainframes, supercomputers, minicomputers, workstations and any variation or related device thereof.

Computing devices 1002 may communicate with imaging devices. Imaging devices may include printing devices. A printing device may be a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical printing device, such as a physical printer, fax machine, scanner, multi-functional peripheral and/or copier is a type of computing device. The printing device may be a single or a plural grouping (e.g., pool or cluster) of two or more devices.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for designing a black generation transfer curve, the method comprising:
    producing a table to convert a first signal in a first signal space to a second signal in a second signal space;
    during each of a plurality of iterations for a device, generating a black generation transfer curve for the device;
    obtaining at each successive iteration color measurement data of the device, wherein the color measurement data relates to a signal-to-color response of the device, and wherein the signal-to-color response is based on measured color of output of the device;
    using the color measurement data to obtain a perceptual constraint between the first signal and the second signal, wherein the perceptual constraint is a linearity constraint based on linearizing a fractional arclength along a device gamut boundary with respect to a dark point and a chromatic primary or secondary color point, the device gamut boundary being obtained from color measurement data of the device;
    designing at each successive iteration a black generation transfer curve for the device constrained by two bounding curves that depend on the color measurement data of the device; and
    adjusting either a black generation transfer curve related to a "K" component or a black generation transfer curve related to a chromatic component of a cyan, magenta, yellow, and black (CMYK) signal, wherein the black generation transfer curve that is not adjusted is automatically updated in relation to the adjustment based on the perceptual constraint, wherein a black generation transfer curve related to a single chromatic primary component of a CMYK signal is adjustable, and a black generation transfer curve related to the remaining two chromatic primary components of the CMYK signal is fixed.

2. The method of claim 1, wherein the first signal is a generic red, green and blue (RGB) signal.

3. The method of claim 1, wherein the first signal is a cyan, magenta and yellow (CMY) signal.

4. The method of claim 1, wherein the second signal is a CMYK signal.

5. The method of claim 1, wherein the linearity constraint is further based on linearizing a relative lightness with respect to a dark point and a chromatic primary or secondary color point.

6. The method of claim 1, wherein the linearity constraint is further based on linearizing a relative chroma with respect to a dark point and a chromatic primary or secondary color point.

7. The method of claim 1, wherein the linearity constraint is further based on linearizing a relative metric distance with respect to a dark point and a chromatic primary or secondary color point.

8. The method of claim 1, further comprising providing a feasible region in relation to the linearity constraint, wherein the feasible region depends on the measurement data.

9. The method of claim 1, wherein the black generation transfer curve is related to a "K" component of a CMYK signal.

10. The method of claim 1, wherein a black generation transfer curve related to two chromatic primary components of a CMYK signal is adjustable, and a black generation transfer curve related to the remaining chromatic primary component of the CMYK signal is fixed.

11. The method of claim 1, wherein the device comprises an imaging device.

12. A system that is configured to design a black generation transfer curve, the system comprising:
    a processor;
    memory in electronic communication with the processor;
    instructions stored in the memory, the instructions being executable to:
        during each of a plurality of iterations for an imaging device, generate a black generation transfer curve for the imaging device;
        obtain at each successive iteration color measurement data of the imaging device, wherein the color measurement data relates to a signal-to-color response of the imaging device, and wherein the signal-to-color response is based on measured color of output of the imaging device;
        use the color measurement data to obtain a perceptual constraint between a first signal and a second signal, wherein the perceptual constraint is a linearity constraint based on linearizing a fractional arclength along a device gamut boundary with respect to a dark point and a chromatic primary or secondary color point, the device gamut boundary being obtained from color measurement data of the device;
        design at each successive iteration a black generation transfer curve for the imaging device constrained by two bounding curves that depend on the color measurement data of the imaging device;
        adjust either a black generation transfer curve related to a "K" component or a black generation transfer curve related to a chromatic component of a cyan, magenta, yellow, and black (CMYK) signal, wherein a black generation transfer curve that is not adjusted is automatically updated in relation to the adjustment based on the perceptual constraint, wherein a black generation transfer curve related to a single chromatic primary component of a CMYK signal is adjustable, and a black generation transfer curve related to the remaining two chromatic primary components of the CMYK signal is fixed; and produce a table to convert the first signal in a first signal space to the second signal in a second signal space.

13. The system of claim 12, wherein the first signal is a generic red, green and blue (RGB) signal.

14. The system of claim 12, wherein the first signal is a cyan, magenta and yellow (CMY) signal.

15. The system of claim 12, wherein a black generation transfer curve related to two chromatic primary components of the CMYK signal is adjustable, and a black generation transfer curve related to the remaining chromatic primary component of the CMYK signal is fixed.

16. The system of claim 12, wherein the instructions are further executable to provide a user interface, wherein the user interface comprises a K curve, a CMY curve, a verification plot and a gamut plot, and wherein alterations to the K curve by a user alter the CMY curve, the verification plot and the gamut plot.

17. A non-transitory computer-readable medium comprising executable instructions for designing a black generation transfer curve, the instructions being executable to:

produce a table to convert a first signal in a first signal space to a second signal in a second signal space;

during each of a plurality of iterations for an imaging device, generate a black generation transfer curve for the imaging device;

obtain at each successive iteration color measurement data of the imaging device, wherein the color measurement data relates to a signal-to-color response of the imaging device, and wherein the signal-to-color response is based on measured color of output of the imaging device;

use the color measurement data to obtain a perceptual constraint between the first signal and the second signal, wherein the perceptual constraint is a linearity constraint based on linearizing a fractional arclength along a device gamut boundary with respect to a dark point and a chromatic primary or secondary color point, the device gamut boundary being obtained from color measurement data of the device;

design at each successive iteration a black generation transfer curve for the imaging device constrained by two bounding curves that depend on the color measurement data of the imaging device; and adjust either a black generation transfer curve related to a "K" component or a black generation transfer curve related to a chromatic component of a cyan, magenta, yellow, and black (CMYK) signal, wherein a black generation transfer curve that is not adjusted is automatically updated in relation to the adjustment based on the perceptual constraint, wherein a black generation transfer curve related to a single chromatic primary component of a CMYK signal is adjustable, and a black generation transfer curve related to the remaining two chromatic primary components of the CMYK signal is fixed.

* * * * *